Dec. 25, 1956 A. F. B. THIES Re. 24,260
PROCESS FOR DRYING TEXTILES
Original Filed March 18, 1952
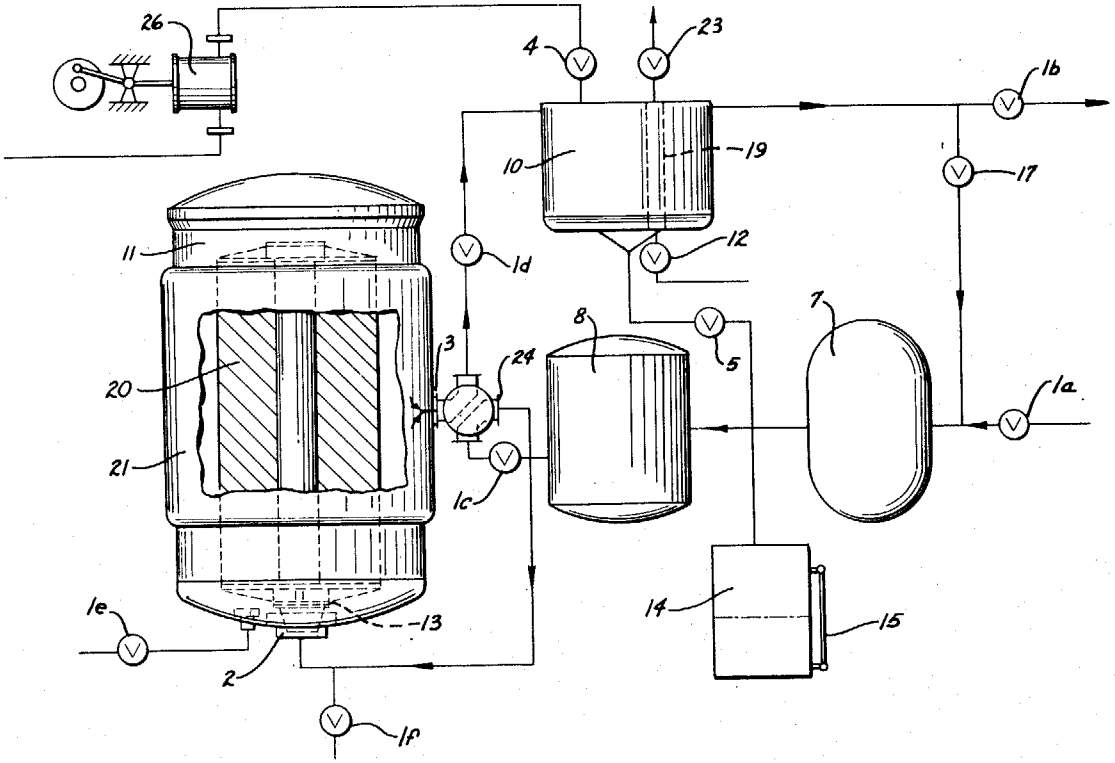
INVENTORS:
Alfred Friedrich
Bernhard Thies
BY Michael S. Striker
agt.

United States Patent Office

Re. 24,260
Reissued Dec. 25, 1956

24,260

PROCESS FOR DRYING TEXTILES

Alfred Friedrich Bernhard Thies, Coesfeld, Westphalia, Germany, assignor to Firma B. Thies, Spezialmaschinenfabrik, Coesfeld, Westphalia, Germany Original No. 2,739,392, dated March 27, 1956, Serial No. 277,100, March 18, 1952. Application for reissue September 11, 1956, Serial No. 609,333

Claims priority, application Germany March 21, 1951

8 Claims. (Cl. 34—15)

Matter enclosed in heavy brackets [ ] appears in the original patent but forms no part of this reissue specification; matter printed in italics indicates the additions made by reissue.

The present invention relates to a process and apparatus for drying textile materials and more particularly to a process and apparatus for drying textile materials more rapidly and at higher temperatures than was hitherto possible.

It is an object of the present invention to provide a process for drying textile materials very rapidly and at relatively high temperatures.

It is a further object of the present invention to provide a process for drying textile materials in a substantially dust-free atmosphere and at temperatures which would normally adversely affect the fibers of the textile material.

It is a still further object of the present invention to provide a process for drying textile materials much more rapidly and more completely than could hitherto be accomplished.

It is another object of the present invention to provide an apparatus for carrying out the above objects of the process of the present invention.

It is still another object of the present invention to provide an apparatus for heating a textile material with heated air in a closed system whereby the moisture absorbed from the textile material is removed from the air, the air is again reheated and the reheated air passed through the textile material so as to effect a complete removal of the moisture from the textile material, the air being maintained in a closed system and thereby being kept substantially dust-free.

Additional objects and advantages of the present invention will be apparent from the following disclosure and the claims.

With the above objects in view, the process of the present invention mainly consists in passing heated air under superatmospheric pressure through a textile material containing moisture so that at least a portion of the moisture contained in said textile material is absorbed by said heated air; drying said air under superatmospheric pressure containing absorbed moisture; reheating said thus dried air; and passing said thus dried and reheated air again through said textile material so that the air for drying said textile material is kept in a closed circuit and maintained substantially dust-free, thus drying said textile material in a substantially dust-free atmosphere.

It is a preferred embodiment of the present invention that the textile material is first treated with super-heated steam so that the temperature of the textile material is raised while the specific moisture content of the textile material is lowered. The raising of the temperature of the textile material causes the water contained in the same to be more quickly evaporated in a later step of passing heated air through the textile material. The specific moisture content of the textile material is lowered by the superheated steam since the textile material, before being treated with the steam, is saturated and the raising of the temperature of the textile material causes some of the moisture contained in the same to be evaporated therefrom while the textile material remains saturated at the higher temperature, thereby lowering the specific moisture contents.

It is another preferred embodiment of the present invention to pass the heated air through the textile material under superatmospheric pressure so that a higher temperature may be employed for evaporating the moisture contained in the textile material without adversely affecting the fibers of the material.

The present invention further provides for passing the heated air through the textile material for the second and perhaps subsequent times in different directions so that a more complete absorption by the heated air of the moisture contained in the textile material can be effected.

The present invention is particularly applicable for drying textile materials such as cross-wound bobbins or yarn in package form which are placed on a special carrier and then placed in a container. Before the present invention, heated air was blown through the material and thus a sufficient drying effect could be obained only by considerable expenditure of power. Furthermore, the constant sucking-in of fresh air caused the disadvantage of particles of dust and other impurities, as well as moisture contained in the atmosphere of air, being blown into the material to be dried.

On the other hand, the present invention offers the possibility of using temperatures of so high a degree that they would affect the fibers when used in a normal drying process; they are, however, admissible owing to the proportionately short time during which, according to the present invention, these high temperatures influence the material and owing to the circulation closed in itself.

The present invention further allows for the drying of the textile material simultaneously with, previous to or after a steam treatment of the same with suitable vapor-forming or volatile substances such as plasticizers.

A preferred process of the present invention comprises passing super-heated steam through a textile material saturated with moisture so as to raise the temperature of said textile material while lowering the specific moisture content of the same; removing the excess steam; passing heated air under super-atmospheric pressure through said textile material containing moisture so that at least a portion of the moisture contained in said textile material is absorbed by said heated air and the temperature of the textile material is raised.

The process of the present invention is most advantageously carried out in an apparatus comprising a chamber; blower means operatively connected to said chamber for blowing air into the same; heater means operatively connected to said blower means for heating the air before it enters said chamber so that heated air is blown into said chamber and through the textile material therein, thereby absorbing moisture from said textile material; first conduit means connected to said chamber for removing said air containing absorbed moisture from the same; extracting means operatively connected to said conduit means for extracting the moisture from said air containing absorbed moisture so as to dry said air; and second conduit means operatively connected to said extracting means and to said blower means for passing said dried air from said extracting means to said blower means whereby the air for drying the textile material is carried through a closed circuit throughout the operation.

It is a preferred embodiment of the present invention that the heated air is passed through the textile material to be dried in different directions so as to effectuate a more complete drying of the textile material. Accordingly, the apparatus of the present invention provides a considerable improvement by the use of a suitable reversing means for reversing the direction of the heated air through the chamber. This reversing mechanism may consist of valve means fitted between the inlet and outlet pipes of the chamber, which when turned in one direction causes the heated air to pass into the inlet pipe and the air containing absorbed moisture to pass out of the outlet pipe, and when turned in another direction causes the outlet pipe to become the inlet pipe and the inlet pipe to become the outlet pipe so that the air is passed through the chamber in a different direction, thereby allowing for a more uniform drying of the textile material in the chamber.

The present invention greatly reduces the time of drying, especially when working under superatmospheric pressure, thereby resulting in a great economy in power. Moreover, contamination of the textile material, which normally occurs with the use of impure, fresh air, is prevented. The use of superatmospheric pressure renders it possible to introduce large quantities of heat into the textile material, which may be contained in wound packages, while the output of the blower remains nearly the same, thus effecting a shortening of the drying time by a more rapid absorption of heat and consequently, by a quicker evaporation of the water. As is well known, the ability of the air to absorb heat is considerably increased in proportion to the rising pressure, whereby of course the weight of the gas respectively of the gas mixture contained in the apparatus is augmented.

The air leaving the chamber is dried by means of a water extractor working with direct or indirect cooling, which serves to separate the water contained in the current of saturated air. Instead of using a cooling device, water can be directly injected into the water extractor in order to obtain, by a sudden cooling, a separation of the water from the air. Also, a separation of the humidity is obtained by the diminution of the speed of the air entering the water-extractor. Thus, a lowering of the temperature of the air sucked into the blower is effected so that a proportionally simple pressure-proof blower can be used.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which the figure is a schematic drawing of an apparatus according to the present invention.

Referring now to the drawing a drying container 11 holding the material to be dried 20 on the carrier 13, is equipped with an inside perforated double casing 21 and two inlets or outlets 2 and 3. Both these inlets or outlets lead to a valve means 24 which is connected through a heating battery 8 to the blower 7 communicating with the outside air by means of a valve 1a. This valve means 24 and with it the container 11 is furthermore connected by another pipe with the water extractor 10 and through this extractor also to the blower 7.

As may be seen, the valve means 24 in one position causes the air blown by blower 7 through heater 8 to enter the container 11 at the bottom thereof through inlet 2, whereas the air containing absorbed moisture leaves the container 11 through the outlet 3 and thence to the water extractor 10. When turned at a 90° angle, the valve means 24 causes the heated air passing from the blower 7 through the heater 8, to enter the container 11 through pipe 3 which now becomes an inlet pipe and to leave the chamber 11 through 2 which now becomes an outlet pipe and to pass through the valve 24 to the water extractor 10.

The conduit leading from extractor 10 to the blower 7 is provided with another valve 17 and a second connection to the outside air through the valve 1b. The water extractor 10 is provided with a cooling device 19 equipped with an inlet 12 and an outlet 23 for the cooling water as well as the outlet 5 to the measuring receptacle. It is further connected by the valve 4 with a compressed gas container 26 and by the valve 22 with an evacuating device 18. The outlet 5 enters into a measuring receptacle 14 provided with a water level indicator 15.

The water level indicator 15 enables the operator to observe the exact progress of the drying by ascertaining at what time the receptacle 14 has received the quantity of water known to be contained in the textile material by the previous weighing of the same. Valves 1c, 1d, 1e, and 1f are operated during the process.

The operation of the apparatus is as follows:

For the steaming of the material, valves 1c and 1d are closed and the material 20 is placed on the carrier 13 in the container 11. Superheated steam is directed through the steam valve 1e under pressure. Valve 1f is open so as to allow the excess moisture, after the steam has passed through the material 20, to escape. Valves 1e and 1f are then closed. Valves 1c and 1d are then opened while valves 1a and 1e remain closed. Valve 5 is also closed and compressed gas is sent into the apparatus through valve 4 under superatmospheric pressure.

The heating battery 8 is heated and the cool water valve 12 in the water extractor 10 is open, as is cool water outlet valve 23. Valve 17 is opened so as to start the circulation and the blower 7 is started. The blower 7 causes the air to pass through the heater 8 so that hot air is passed through the valve 24, into the chamber 11 and through the material 20. In the position indicated in the drawing the four-way valve 24 causes the heated air from the heater 8 to pass into the container 11 through inlet 2. As previously described, the four-way valve may be turned so as to cause the heated air to pass into the container 11 through valve 3.

In the position shown in the drawing, the heated air enters the chamber through valve 2, passes through the material 20, leaves the chamber through the valve 3 and is thereby directed to the water extractor 10. Through the sudden expansion of the air containing absorbed water in the water extractor 10, combined with the cooling device 19, the moisture content of the air is lowered. The water removed from the air is passed through valve 5 into the measuring receptacle 14 with the water level indicator 15.

The air, with the water removed therefrom, passes through valve 17 and by means of the blower 7 is again forced into the heater 8 and then into the container 11.

The apparatus and process of the present invention allows for a saving of about 50% in the time required to dry textile material by ordinary processes.

It will be understood that each of the elements described above, or two or more together, may also find a useful application in other types of drying apparatus and processes differing from the types described above.

While the invention has been illustrated and described as embodied in an apparatus and process for drying textile materials, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A process for drying textile materials, comprising, in combination, the steps of passing *under superatmospheric pressure* heated air [under superatmospheric pressure] through a textile material containing moisture so that at least a portion of the moisture contained in said textile material is absorbed by said heated air under superatmospheric pressure *and said heated air leaves said textile material under superatmospheric pressure and containing moisture absorbed from said textile material;* drying said air containing absorbed moisture; reheating said thus dried air; and passing said thus dried and reheated air again through said textile material so that the air for drying said textile material is kept in a closed circuit and maintained substantially dust-free, thus drying said textile material in a substantially dust-free atmosphere.

2. A process for drying textile materials, comprising, in combination, the steps of passing super-heated steam through a textile material saturated with moisture so as to raise the temperature of said textile material while lowering the specific moisture content of the same; passing *under superatmospheric pressure* heated air [under superatmospheric pressure] through said textile material containing moisture so that at least a portion of the moisture contained in said textile material is absorbed by said heated air under superatmospheric pressure *and said heated air leaves said textile material under superatmospheric pressure and containing moisture absorbed from said textile material;* drying said air containing absorbed moisture; reheating said thus dried air; and passing said thus dried and reheated air again through said textile material so that the air for drying said textile material is kept in a closed circuit and maintained substantially dust-free, thus drying said textile material in a substantially dust-free atmosphere.

3. A process for drying textile materials, comprising, in combination, the steps of passing *under superatmospheric pressure* heated air [under superatmospheric pressure] through a textile material containing moisture so that at least a portion of the moisture contained in said textile material is absorbed by said heated air under superatmospheric pressure *and said heated air leaves said textile material under superatmospheric pressure and containing moisture absorbed from said textile material;* drying said air containing absorbed moisture; reheating said thus dried air; and passing said thus dried and reheated air again under superatmospheric pressure through said textile material so that the air for drying said textile material is kept in a closed circuit and maintained substantially dust-free, thus drying said textile material in a substantially dust-free atmosphere.

4. A process for drying textile materials, comprising, in combination, the steps of passing super-heated steam through a textile material saturated with moisture so as to raise the temperature of said textile material while lowering the specific moisture content of the same; passing *under superatmospheric* pressure heated air [under super atmospheric pressure] through said textile material containing moisture so that at least a portion of the moisture contained in said textile material is absorbed by said heated air under superatmospheric pressure *and said heated air leaves said textile material under superatmospheric pressure and containing moisture absorbed from said textile material;* drying said air containing absorbed moisture; reheating said thus dried air; and passing said thus dried and reheated air under superatmospheric pressure again through said textile material so that the air for drying said textile material is kept in a closed circuit and maintained substantially dust-free, thus drying said textile material in a substantially dust-free atmosphere.

5. A process for drying textile materials, comprising, in combination, the steps of passing *under superatmospheric pressure* heated air [under superatmospheric pressure] through a textile material containing moisture so that at least a portion of the moisture contained in said textile material is absorbed by said heated air under superatmospheric pressure *and said heated air leaves said textile material under superatmospheric pressure and containing moisture absorbed from said textile material;* drying said air containing absorbed moisture; reheating said thus dried air; and passing said thus dried and reheated air again through said textile material in a direction different from the direction through which said heated air was first passed through said textile material so that the air for drying said textile material is kept in a closed circuit and maintained substantially dust-free, thus drying said textile material in a substantially dust-free atmosphere.

6. A process for drying textile materials, comprising, in combination, the steps of passing *under superatmospheric pressure* heated air [under superatmospheric pressure] through a textile material containing moisture so that at least a portion of the heat contained in said heated air is transferred to said textile material so that at least a portion of the moisture contained therein is evaporated and absorbed by said heated air under superatmospheric pressure *and said heated air leaves said textile material under superatmospheric pressure and containing moisture absorbed from said textile material;* cooling said air containing evaporated and absorbed moisture thereby condensing the latter and separating it from said air so as to dry the same; reheating said thus dried air; and passing said thus dried and reheated air again through said textile material so that the air for drying said textile materials is kept in a closed circuit and maintained substantially dust-free, thus drying said textile material in a substantially dust-free atmosphere.

7. A process for drying textile materials, comprising, in combination, the steps of passing *under superatmospheric pressure* heated air [under superatmospheric pressure] through a textile material containing moisture so that at least a portion of the heat contained in said heated air is transferred to said textile material so that at least a portion of the moisture contained therein is evaporated and absorbed by said heated air under superatmospheric pressure *and said heated air leaves said textile material under superatmospheric pressure and containing moisture absorbed from said textile material*; cooling said air containing evaporated and absorbed moisture thereby condensing the latter and separating it from said air so as to dry the same; reheating said thus dried air; and passing said thus dried and reheated air again under superatmospheric pressure through said textile material so that the air for drying said textile material is kept in a closed circuit and maintained substantially dust-free, thus drying said textile material in a substantially dust-free atmosphere.

8. A process for drying textile materials, comprising, in combination, the steps of passing *under superatmospheric pressure* heated air [under superatmospheric pressure] through a textile material containing moisture so that at least a portion of the heat contained in said heated air is transferred to said textile material so that at least a portion of the moisture contained therein is evaporated and absorbed by said heated air under superatmospheric pressure *and said heated air leaves said textile material under superatmospheric pressure and containing moisture absorbed from said textile material*; cooling said air containing evaporated and absorbed moisture thereby condensing the latter and separating it from said air so as to dry the same; reheating said thus dried air; and passing said thus dried and reheated air again through said textile material in a direction different from the direction through which said heated air was first passed through said textile material so that the air for drying said textile material is kept in a closed circuit and maintained substantially dust-free, thus drying said textile material in a substantially dust-free atmosphere.

References Cited in the file of this patent or the original patent

UNITED STATES PATENTS

| | | |
|---|---|---|
| 822,239 | Bedortha et al. | June 5, 1906 |
| 1,166,819 | Derby et al. | Jan. 4, 1916 |
| 1,324,072 | Shorman | Dec. 9, 1919 |
| 1,415,623 | Atkinson | May 9, 1922 |
| 1,524,567 | Plews | Jan. 27, 1925 |
| 1,540,926 | Brandwood et al. | June 9, 1925 |
| 1,629,167 | Krantz | May 27, 1927 |
| 1,694,907 | Brown | Dec. 11, 1928 |
| 2,080,179 | Merriam et al. | May 11, 1937 |
| 2,109,087 | Goodings | Feb. 22, 1938 |
| 2,451,692 | Pugh | Oct. 19, 1948 |
| 2,521,081 | Morrison | Sept. 5, 1950 |
| 2,595,261 | Honegger | May 6, 1952 |

FOREIGN PATENTS

| | | |
|---|---|---|
| 479,414 | Germany | July 16, 1929 |

OTHER REFERENCES

Drying by Means of Air and Steam, by E. Hausbrand. Published 1924. Pages 45 to 47 relied on.